United States Patent

[11] 3,587,742

| [72] | Inventors | Clifford V. Wittenwyler<br>Union, N.J.;<br>Robert S. Forrest, Houston, Tex. |
|---|---|---|
| [21] | Appl. No. | 856,036 |
| [22] | Filed | Sept. 8, 1969 |
| [45] | Patented | June 28, 1971 |
| [73] | Assignee | Shell Oil Company<br>New York, N.Y. |

[54] CONSOLIDATION OF SHALLOW FORMATIONS WITH ACID MODIFIED EPOXY RESINOUS MATERIAL
7 Claims, 3 Drawing Figs.

| [52] | U.S. Cl. | 166/295 |
| [51] | Int. Cl. | E21b 33/138 |
| [50] | Field of Search | 166/294, 295 |

[56] References Cited
UNITED STATES PATENTS

| 3,176,769 | 4/1965 | Treadway et al. | 166/295 |
| 3,294,165 | 12/1966 | Meigs et al. | 166/295 |
| 3,297,089 | 1/1967 | Spain | 166/295 |
| 3,316,966 | 5/1967 | Dear | 166/295 |
| 3,339,633 | 9/1967 | Richardson | 166/295 |
| 3,384,174 | 5/1968 | Smith | 166/295 |
| 3,419,073 | 12/1968 | Brooks | 166/295 |
| 3,476,189 | 11/1969 | Bezemer et al. | 166/295 |
| 3,478,824 | 11/1969 | Hess et al. | 166/295 |

*Primary Examiner*—Stephen J. Novosad
*Attorneys*—George G. Pritzker and J. H. McCarthy ABSTRACT: A method of consolidating a shallow, low temperature unconsolidated earth formation in order to improve subsequent oil recovery by means of a fluid drive, comprising treating the formation with (1) a hydrocarbon preflush, (2) a resinous solution containing an epoxy resin forming material, an amine curing agent, an organic phosphate and/or silane coupling agent and as an accelerator a polar-substituted carboxylic acid, e.g., a hydroxy containing carboxylic acid, said additive mixture being dispersed or dissolved in a polar-containing solvent and (3) an overflush comprising of a hydrocarbon liquid.

INVENTORS
CLIFFORD V. WITTENWYLER
ROBERT S. TORREST

BY: *George G. Pritzker*
AGENT

CONSOLIDATION OF SHALLOW FORMATIONS WITH ACID MODIFIED EPOXY RESINOUS MATERIAL

BACKGROUND OF THE INVENTION

This invention relates to an improved process for preparing earth treating compositions, and more particularly for preparing compositions to be used for treating unconsolidated earth formations surrounding oil wells. In particular, it relates to the preparation of compositions used for treating shallow, low temperature preferentially water wetted unconsolidated earth formations surrounding oil wells to improve their permeability to oil and for consolidating unconsolidated or substantially unconsolidated formations such as loose sand, particularly surrounding oil wells while retaining a substantial degree of permeability to oil therein.

STATE OF THE ART

It is well known in the art that various resin-forming compositions can be used to consolidate earth formations in order to improve oil recovery therefrom as described in the Journal of Petroleum Technology for Apr., 1967, pages 487—494, or Dec., 1966, pages 1537—1543, or Dec. 1961, pages 1221—1229, or as described in numerous U.S. Pats. such as 3,297,289; 3,294,168; 3,123,138; 3,302,718; 3,221,814 or 3,294,166. However, problems are caused when shallow, low temperature, generally below 150° F. and even below 125° F. are to be consolidated since the time for effecting consolidation under such conditions is very difficult to control, time consuming, and the process becomes very costly.

One of the most effective sand consolidation resin formulations for use under high temperature conditions normally encountered in consolidating deep formations is the subject of U.S. Pat. Nos. 3,339,633 and 3,294,166 and articles such as described in the World Oil for June 1968, pages 81—84 or Oil and Gas Journal for Apr. 21, 1969, which articles are based on the subject matter of these two patents. However, the formations are described in these references have been found to be relatively ineffective for use in low temperature shallow unconsolidated formations.

ESSENCE OF THE PRESENT INVENTION

It has now been discovered that shallow, low temperature unconsolidated earth formations containing oil producing zones can be effectively consolidated without essential modification in the permeability of the formation using an epoxy-amine resin and subsequent oil recovery substantially improved when using a fluid drive such as water flooding by means of the following procedure:

a. preflushing the formation penetrated by a well with a liquid hydrocarbon;

b. injection into the mass to be consolidated, a polar-containing solution into which is incorporated a mixture of polyepoxides having a plurality of vicinal epoxy groups and polyamines having a plurality of nitrogen atoms having at least one hydrogen atom attached to each nitrogen atom, a silane and/or an organic phosphate and a polar-substituted carboxylic acid such as a hydroxy-containing carboxylic acid, said mixture of organic compounds being dispersed or dissolved in a polar-containing solvent such as organic ester of an aliphatic alcohol and a monocarboxylic acid, and c. overflushing the permeable mass with a liquid hydrocarbon.

In the present invention, the resinous materials, silane and/or phosphate and organic acid such as a hydroxy-containing organic acid, are premixed at the surface, before injection into the reservoir, and thereby no problem is experienced in achieving the proper chemical proportion between the epoxy and the amine for the best grain to resin bond strength. This is advantageous over processes in which the epoxy and amine are combined in situ, being separately injected. In addition, since the epoxy and amine are already partially polymerized when they are injected, they are less affected by naturally occurring substances in the reservoir In this invention, mixtures of silane, aromatic acid and polyepoxides and curing agents blended with one another above ground and are injected into a reservoir in a liquid vehicle from which they precipitate as the molecular weight of the epoxy curing agent polymer increases to the point it is no longer completely soluble in the vehicle. At the time of the precipitation of the polymer, the reaction has almost reached the gelling state and considerable amounts of the liquid vehicle are still incorporated in the polymer precipitated which increase the bulk of the polymer with a resulting somewhat decrease in permeability in the reservoir.

However, manifestly different results are achieved in the practice of the instant invention because of the novel overflush technique. First, the overflush effects a partition of a predominantly polymer phase from the solvent vehicle prior to the time the epoxy-amino polymer has reached the high molecular weights which causes it to precipitate from its vehicle. The predominantly polymer phase is drawn into the small interstitial spaces at the contact point of the grains by capillarity and tends to carry the silt with it because of the high surface tension. The second effect of the overflush is to extract additional solvent from the polymer phase, thereby reducing its volume and leaving the reservoir more permeable. As the overflush extracts the vehicle from the polymer phase, it concentrates it further which also causes the polymerization reaction to proceed faster, resulting in a much shorter curing interval than known processes. For example, 4 hours versus the usual 12 for known processes.

Other advantages are obtained by the overflushing since its hydrodynamic movement through the pores in the presence of the viscous epoxy-amino polymer tends to move the smaller particles into the polymer clinging in the interstitial spaces between the larger grains. The movement of these fines into such regions will improve permeability and reduce the amount of polymer required for the consolidation.

Also, the polymer phase tends to coat the shaley portions of the reservoir leaving them "lock" in a resinous sheath within the reservoir.

Another advantage is gained from the fact that the polymer phase is slightly soluble in the overflush after partition and before polymerization has proceeded sufficiently to cause it to be precipitated from the vehicle. Thus, after partition of the polymer phase from the solvent vehicle has occurred, the contained injection of the overflush dissolves some of the polymer phase immediately contiguous to the borehole leaving this portion more weakly consolidated than portions of the reservoir further radially from the borehole and this action leads to consolidation in which there is no noticeable change in permeability after consolidation by the method of this invention.

As mentioned above, this invention contemplated the use of polyepoxides and polyamines mixed with one another which tend to have good wetting properties and also form superior bonds with earthen materials. For convenience, the polyepoxide and polyamine mixtures are often referred to herein as "resin," "polymer" or "epoxy-amine polymer and/or resin." These eopxy-amino resins are quite superior to phenolic resins or epoxides cured with other curing agents, such as anhydrides and therefore, they are preferred curing agents in the practice of this invention.

More specifically, the present invention contemplates the use of polyepoxides which are those organic mixtures containing more than on vic-epoxy group

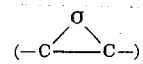

which can be incorporated in organic compounds which are saturated, unsaturated, aliphatic, cycloaliphatic, aromatic or heterocylic. Often, these polyepoxides are described in terms of their epoxy equivalent value, which is determined from the average molecular weight divided by the number of epoxy group per molecule. This terminology and the types of polyepoxides useful in this invention are disclosed in U.S. Pat.

No. 2,633,458. More generally, the polyepoxides suitable for this invention are well-known materials of commerce and many are described in the book "Epoxy Resins" by Lee and Neville, McGraw-Hill, New York, 1957.

Examples of some polyepoxides useful in the practice of this invention are the glycidyl polyethers of dihydric phenols which can be prepared by the condensation of dihydric phenols with epiclorogydrin in an alkaline medium. Polyhydric phenols which can be condensed with epichlorohydrin to form these polyepoxides are resorcinol, catechol, hydroquinone, methyl resorcinol and polynuclear phenols, such as 2,2-bis(hydroxyphenyl)propane (Bis phenol A), 2,2-bis(4-hydroxphenyl) butane, 4,4–dihydroxy benzophenone, bis (4-hydroxyphenyl)ethane. 2,2-bis(4-hydroxyphenyl) pentane, 1,5-dihydroxynaphthalene, and the like. The above-mentioned polyhydricphenols may also contain ring halogen atoms and their condensation product with epichlorohydrin will contain the same.

The epoxide products obtained by the condensation of epichlorohydrin with these polyhydric phenols are not a single, simple molecule but a complex mixture of glycidyl polyethers having the well-known terminal vic-epoxy groups. The epoxy equivalent weight can vary from about 120 to about 1000 and the preferred average molecular weight can vary from about 300 to about 500 and preferably between 300 and 400.

As indicated above, the invention uses polyamines as a curing agent for the polyepoxides described above. Not only are stronger resins obtained with the polyamine but the amines tend to impart preferential sand-wetting properties to the partially polymerized epoxy-amino resins mixtures and yield stronger consolidation. Beyond these two important properties mentioned above, the polyamines are preferred because it is necessary that the curing agent be generally insoluble in the overflushing liquid which is a predominantly aliphatic liquid hydrocarbon. In essence, the invention contemplated the use of polyamines which have a solubility of less than about 2—3 parts per 100 in the predominantly aliphatic liquid hydrocarbon used as the overflush (discussed more fully hereinafter). For example, the more soluble polyamines, such as 1,2-diaminoethane, diethylene triamine, triethylamine, N,N-dicyclohexanolamine and so forth would tend to be taken up (extracted) by the overflushing hydrocarbon leaving a deficiency of polyamine in relationship to the polyepoxide for the best bond strength. Thus, it is apparent that the parameter restricting the use of polyamines is that it be generally insoluble in the predominantly aliphatic hydrocarbons used for overflushing the solutions of the epoxy-amino polymers or resins deployed in the solvent vehicle.

Besides having the above solubility characteristics in the overflushing fluid, it is also desirable that the polyamines have two or more amino functional groups which have at least one active hydrogen. Amines having the requisite characteristics are sulfonyldianiline, 1,3–diaminobenzene, 4,4–methylene dianiline, and the like. A person skilled in the art can select any polyamines meeting the parameters set forth above from those well known in the art.

The silane additive which improves the compressive strength of the consolidated mass can be an organo-functional silane which should be understood as being a polyfunctional organic substance containing at least one silicon atom having one functional group suited for reaction with the particles of the mass to be consolidated and another functional group suitable for reacting with one of the components of the polyepoxide and polyamine polymer. Examples of organo-functional silanes are "amino-functional silane" or an "epoxy-functional silane."

Especially if the materials to be consolidated contain large amount of siliceous grains, such as sand, the functional groups suitable for reacting with the grains of the mass to be consolidated are preferably alkoxy groups, such as methoxy or ethoxy groups. Examples of useful amino-functional silanes are:

$(CM_3O)_3SI-CH_2-CH_2-CH_2-NH-CH_2-CH_2-NH_2$
(N-aminoethyl-aminopropyltriethoxy-silane) and
$(C_2H_5O)_3Si-CH_2-CH_2-CH_2-NH_2$
(gamma-aminopropyltriethyoxy-silane).

Further, the following examples of epoxy-functional silanes:

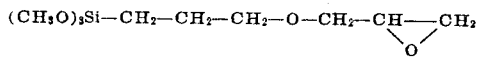

(gamma-glycidoxypropyltrimethoxy-silane)

and

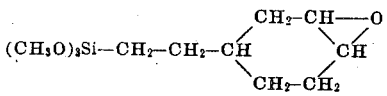

(3,4-epoxycyclohexylethyltrimethoxy-silane). (A186)

All of the compounds represented by the above formulas can be obtained from the Silicone Division of Union Carbide Corporation, N.Y.C. under the symbols A1120, A1100, A174, A186 respectively.

The presence of even small amounts of such silane compounds in the consolidation made according to this invention results in highly superior strengths. It is generally preferred that these metal organic compounds be present in concentrations of 1 percent or less by volume of the solution which is used as a vehicle to introduce them into the portion to be consolidated. In fact, concentrations less than 1 percent by volume are extremely useful and a very satisfactory range is from 0.25 percent to 1 percent by volume of the preflush fluid used to introduce them into the reservoir.

The organic acids which are added to the resin blend to control the reaction rate include such acids as aromatic acids e.g. benzoic acid, salicylic acid, tertbutyl benzoic acid and mixtures thereof. Also other type of organic carboxylic acids can be used such as aliphatic carboxylic acids e.g. lactic acid, thiolactic acid, thioglycolic acid, monochloracetic acid, acetic acid and mixtures thereof and with aromatic acids. The amount of acid such as salicylic acid which is added to the epoxy-amino resin solution is governed by the temperature of the formation which is normally below 125° F. and can vary between 0.01 percent and 5 percent and preferably between 0.1 percent and 1 percent based on the total volume of the resin containing solution.

Subsequent to the injection of the epoxy-amino solution into the reservoir and within the "useful interval" of the portion of the reservoir having the solution therein it must be overflushed with an overflushing liquid. This overflushing liquid must be prepared to meet certain requirements which are (1) that the polyepoxides, aromatic polyamines and their reaction product be virtually insoluble in the overflushing liquid and (2) that the solvent vehicle for the epoxy-amino mixture be miscible in the overflushing liquid. Liquids meeting these requirements are the predominantly aliphatic hyrocarbon fractions of crudes, such as brightstock oil, diesel oil and the like. For example, a 1:1 mixture of brightstock and No. 2 diesel oil makes a good overflushing liquid for the practice of this invention. Other substances can be employed so long as the two requirements set-forth above are satisfied, and such substances can be identified by persons skilled in the art.

In practice, it is sometimes desirable to adjust the viscosity of the overflushing liquid so that it exceeds that of the epoxy-amino solution dispersed in the reservoir to achieve more favorable results. Thus, brightstock and diesel oil may be blended to achieve the proper viscosity before injection into the reservoir and this often improves the strength of the consolidation made according to this invention.

Also, it is desirable to include some of the solvent vehicle in at least the initial portion of the overflushing liquid because this tends to make the partition of the "polymer-rich phase" more gradual and also slow down the initial extraction rate of the solvent vehicle from the polymer-rich phase. In general, the overflushing liquid is tailored to obtain the proper viscosity and about 5 percent of the volume of the overflushing liquid should be a solvent vehicle to give a gradual extraction rate.

PREFERRED EMBODIMENT OF THE INVENTION

Figure 1:
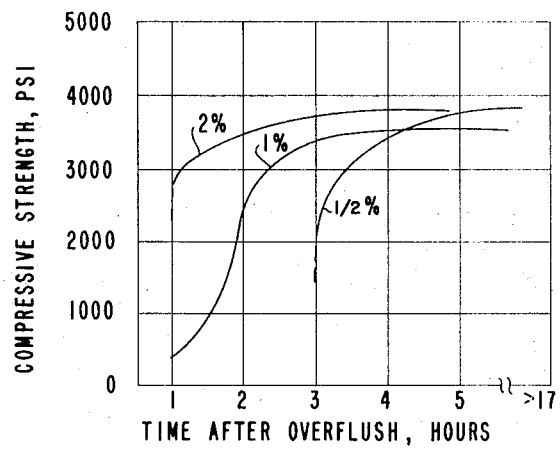
FIGS. 1, 2 and 3 graphically illustrate the results of compressive strength tests, for various time intervals at constant bath temperatures of 110, 130 and 150° F., respectively.

A placement technique involving minimum operational risk and maximum operational risk and maximum flexibility typically required in conventional operations is described as follows:

1. The zone to be consolidated is perforated in casing fluid dense enough to hydrostatically overbalance exposed formation pressure.
2. A retrievable packer assembly with tubing wiper plug catcher and circulating valve is installed on internal-flush work tubing to isolate the perforated zone.
3. The zone being consolidated can be acidized to establish injectivity.
4. Treatment fluids being separated by wiper plugs which are caught below the retrievable packer are pumped through the work tubing.
5. After waiting to allow resin curing, the differential pressure into this formation is abruptly increased by the release of the packer or opening of the circulation valve.
6. The work tubing assembly is pulled from the well, and if other zones are to be consolidated, steps 1 through 5 are repeated for each zone.
7. With all zones hydrostatically overbalanced, production tubing and associated equipment are installed.
8. The rig is removed. The well can be produced.

To demonstrate the physical extraction effected by overflushing, the following test was performed. A polyepoxide (Shell EPON 828) was mixed with an aromatic polyamine (methylene dianiline) to which was added a silane (Union Carbide Silicone Division A–186 or A–174) and salicylic acid and the additive mixture was added to a solvent vehicle (ethyl acetate) until it represented 60 of the volume of the resulting solution. This solution was mixed with a small volume (approximately one-tenth of the solution) of a 1:1 mixture of brightstock and No. 2 diesel oil, thoroughly mixed, and the overflush was found to contain about 10 percent ethyl acetate by volume and the remaining polymer solution had increased measurably in viscosity.

In general, the amount of the overflushing liquid should be from 2 to 4 times the volume of the polymer solution dispersed in the reservoir. An optimum amount seems to be about 2½ times the volume of the polymer solution.

After the overflushing step was completed, the well was shut in until the resin (polymer) completed its cure. The time required is a function of bottom hole temperature: at or above 140° F., the cure was complete in 1 hour and; at 120° F. and the cure time was about 9 hours and without the presence of salicylic acid.

The following examples are set-forth as nonlimiting illustration of the invention and was used in the field to consolidate "O₂" sand at 7,480 feet which required consolidation because of the solids intrusion problem.

EXAMPLE 1

In a producing well at 7,480 feet, an electric log revealed a poorly developed member in the center of a 4-foot perforated producing zone having 4 perforations per foot which indicated the presence of shale or shaley sand, not readily consolidated with known processes. This producing interval was isolated with appropriate packers and water was injected into the reservoir through the perforations at 2,100 p.s.i.g. at the rate of 1 barrel/minute.

After the water wash, the following materials were sequentially injected:

1. 756 gallons 50:50 blend Shell's aromatic solvent (Cyclo Sol 73 and diesel oil (Dieseline 50). (Preflush)
2. 756 gallons isopropyl alcohol. (Preflush)
3. 504 gallons Dieseline 50. (Preflush)
4. spacer (medium aromatic oil liquid to volume of resin solution 250 gallons).
5. resin solution (all ingredients premixed before pumping into well) composed of:
    a. 121 gallons Shell EPON 828.
    b. 24 gallons Shell curing agent Z (aromatic polyamine mixture of methylene dianiline and phenylene diamine).
    c. 108 gallons ethyl acetate. (This solution separated from preflush and overflush by wiper plugs.)
    d. 1 gallon Silane A–186.
    e. 11 pounds salicylic acid.
5. Overflushing liquid in two slugs (a and b):
    a. 84 gallons Dieseline 50, 168 gallons Silver Shell 30 (motor oil), and 13 gallons ethyl acetate.
    b. 252 gallons Dieseline 50 and 252 gallons Silver Shell 30 (motor oil).

the well was shut-in 4 hours and diesel injected at a rate of 9.5 bbl./min. with a pressure of 2,600 p.s.i. The pressure was raised to 3,300 p.s.i. (about 0.9 bbl./min.) momentarily and it dropped suddenly to 3,100 p.s.i. the rate was reduced to 0.5 bbl./min. and the required pump pressure was then 2,300 p.s.i. indicating a slight fracture had occurred.

The well was cleaned out and placed on production. The fluid was swabbed to 2,500 feet and the well began to flow. An estimated 1 barrel of sand was recovered during the swabbing operations. After recovering the injected liquids the well tested at a rate of 187 bbl./day of oil, 0.1 percent water, no sand, GOR 732 cu.ft./bbl. with a 940 osi tubing pressure through a 10/64-inch choke.

The well thus treated produced 256 bbl./day of oil with no sand.

Legend

Shell Cyclo Sol 73–diesel fuel oil with approximately 60 aromatic content
Shell Dieseline 50–diesel fuel oil

EXAMPLE II

Preflush

Three preflushes were injected. All fluids were injected at a pressure gradient which will not hydraulically fracture the formation:

1. three pore volumes (1 pore volume is defined as the pore space in the formation to be consolidated) of diesel oil.
2. three pore volumes of isopropyl alcohol.
3. one pore volume of a medium aromatic oil.

Resin Solution

One-half to one pore volume of the following mixture was injected:

1. (Component A) consisting of EPON resin 828 in solvent, thoroughly combined with (Component B), a curing agent, namely, methylene dianiline
2. (Component C), consisting of an accelerator chemical, added as required to control curing time at low formation temperatures, namely, salicylic acid and a compression strength imparting additive, namely, a silane (silane A–186).

Overflush

Three to six pore volumes of a blended oil mixture designed to match the viscosity of the resin solution at bottom-hole conditions were injected.

In actual field application the various chemicals must arrive at the formation in relatively uncontaminated state without significant volumes lost in the placement system.

The consolidation system was pumped at rates which preclude premature resin curing with pressures which do not cause fracturing.

Effective zonal isolation behind production casing and adequate communication through the casing and cement sheath to the formation are required. Consolidation chemicals should be injected through all holes in the casing to insure successful sand elimination.

The curing time is a strong function of salicylic acid concentration at low temperatures (below 125° F. since with salicylic acid present (1.5 percent) the curing time was about 2 hours and without it the curing time was over 9 hours.

EXAMPLE III

Glass tubes 28 mm. in diameter and 7 inches long were filled with about 90 cc. of Clemtex No. 5 sand. This sand was specified as having an 80 to 120 mesh size distribution, although a sieve analysis shows that about 20 percent of the particles pass the 120 mesh sieve and are retained on a 200 mesh screen.

Tubes were packed by allowing the sand to fall through a series of wire screens into the tubes below. About 120 minutes were required to fill a tube in this manner, and the resulting pack was more uniform that could be obtained by hand packing. Consolidated samples resulting from hand packs had more to break into two or three pieces on removal of the glass tube; however, the compressive strengths were approximately equal regardless of the method of packing.

The samples were treated in the following order with the liquids forced through the tubes under 5 p.s.i.g. at room temperature:

1. 100 cc. of diesel oil;
2. 100 cc. of isopropyl alcohol (99.5 percent 1;
3. 35 cc. of Shell medium aromatic oil;
4. 50 cc. of resin mix containing up to 2 percent salicylic AC acid and prepared as indicated below;
5. 100 cc. of a mixture of 33 percent high oil (Valvata oil No. 70) and 67 percent diesel oil.

The resin mixture was prepared by adding one part of weight of EPON resin 828 to one part of a solution containing 69 percent ethyl acetate, 30 percent methylene dianiline and 1 percent silane A-186. The catalyst, salicylic acid, was then added in a percentage corresponding to the mixture weight without catalyst, i.e., 1 percent catalyst means that one gram of salicylic acid was added to 100 grams of resin mixture.

The sample was then placed in a constant temperature bath and allowed to cure for a given length of time. After curing, the samples were washed with isopropyl alcohol, the glass tube was broken away from the consolidated sample, and the sample was cut into 4 to 6 1-inch-long pieces for compressive strength tests.

Figure 2:
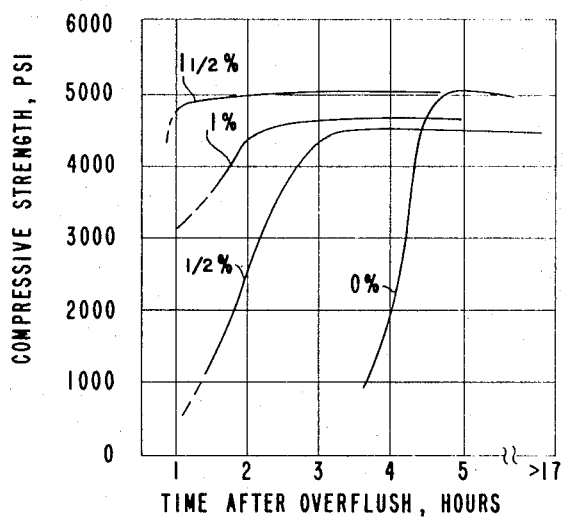
Figure 3:
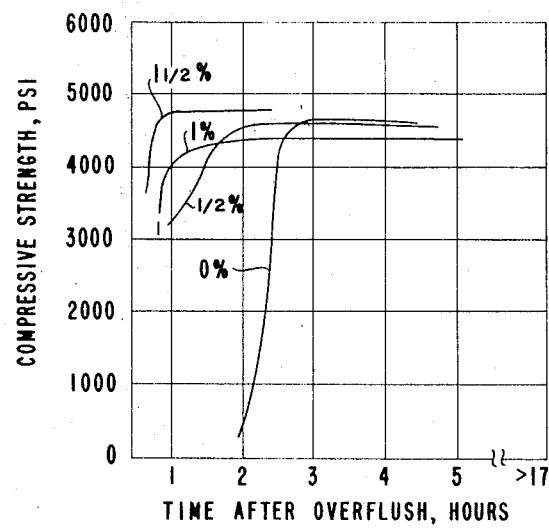

The results of compressive strength tests, for various time intervals in the constant temperature bath at 110, 130, and 150° F., are shown in FIGS. 1, 2, 3.

In general, ultimate compressive strengths reached 4,000 to 5,000 p.s.i. for 130 F. and 150° F. while those 110° F. were somewhat lower. The compressive strengths obtained for one hour or less in the constant temperature bath were approximations due to continued resin cure after removal from the temperature bath, etc.

After the formation has been consolidated by the process of the invention oil can be recovered therefrom by conventional means such as by means of a drive fluid such as water and/or stream drives or miscible drives.

The fluid drives can contain thickeners, viscosity increasers, pushers and the like e.g., polyacrylamides and derivatives, polyalkylene oxide polymers, polyvinyl-alcohol sulfonate and the like some of which are described in U.S. Pats. Nos. 3,341,319; 3,332,904; 3,254,719; 3,367,418; 3,368,620 and 3,370,649.

It is understood that the various changes in the details described to explain the invention can be made by persons skilled in the art within the scope of the invention as expressed in the appended claims.

We claim:

1. An improved process for consolidating a loose earth formation in order to effect subsequent oil recovery therefrom comprising treating the loose oil producing zone of said formation as follows:
   a. injecting into the loose oil producing zone a preflush liquid comprising of hydrocarbon liquid;
   b. injecting a resin consolidating composition comprising a polar-containing solvent containing therein (1) an epoxy resin, (2) an aromatic amine curing agent, (3) an organic silane and/or phosphate and (4) a polar substituted carboxylic acid;
   c. injecting an overflush liquid comprising of a blend of hydrocarbon oils; and
   d. maintaining the liquids (b) and (c) in the formation until consolidation of the treated formation is achieved.

2. The process of claim 1 wherein the preflush liquid (a) is a mixture of diesel oil and isopropyl alcohol; the polar-containing solvent is an organic ester of an aliphatic alcohol and a monocarboxylic acid, the amine curing agent is methylene dianiline and the the acid is a hydroxy aromatic acid.

(3) The process of claim 2 wherein the acid is salicylic acid.

(4) The process of claim 3 wherein after the formation is consolidated it is water flooded to recover oil.

(5) The process of claim 2 wherein the solvent is ethyl acetate.

(6) The process of claim 2 wherein after the formation is consolidated it is water flooded to recover oil.

(7) The process of claim 1 wherein after the formation is consolidated it is water flooded to recover oil.